United States Patent
Koganezawa

(10) Patent No.: US 10,174,683 B2
(45) Date of Patent: Jan. 8, 2019

(54) GAS TURBINE POWER GENERATION EQUIPMENT

(71) Applicant: Mitsubishi Hitachi Power Systems, Ltd., Nishi-ku, Yokohama-shi, Kanagawa (JP)

(72) Inventor: Tomomi Koganezawa, Tokyo (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 704 days.

(21) Appl. No.: 14/441,050

(22) PCT Filed: Nov. 7, 2012

(86) PCT No.: PCT/JP2012/078886
§ 371 (c)(1),
(2) Date: May 6, 2015

(87) PCT Pub. No.: WO2014/073059
PCT Pub. Date: May 15, 2014

(65) Prior Publication Data
US 2015/0292416 A1    Oct. 15, 2015

(51) Int. Cl.
*F02C 9/26* (2006.01)
*F02C 6/08* (2006.01)
(Continued)

(52) U.S. Cl.
CPC ............. *F02C 9/26* (2013.01); *F01D 15/10* (2013.01); *F02C 6/08* (2013.01); *F02C 9/46* (2013.01);
(Continued)

(58) Field of Classification Search
CPC ...... F02C 9/46; F02C 9/52; F02C 9/56; F02C 9/26; F02C 6/08; F05D 2270/091; F05D 2270/092; F01D 15/10
See application file for complete search history.

(56) References Cited

U.S. PATENT DOCUMENTS

| 6,609,379 B2 * | 8/2003 | Nagata | F02C 6/18 60/39.23 |
| 7,260,466 B2 * | 8/2007 | Fujii | F01D 15/10 701/100 |

(Continued)

FOREIGN PATENT DOCUMENTS

| EP | 1 686 671 A2 | 8/2006 |
| EP | 2 072 783 A2 | 6/2009 |
| JP | 2001-296904 A | 10/2001 |
| JP | 2005-51867 A | 2/2005 |
| JP | 4053965 B2 | 12/2007 |

OTHER PUBLICATIONS

International Preliminary Report on Patentability (PCT/IB/338 & PCT/IB/373) dated May 21, 2015, including Written Opinion (PCT/ISA/237) (Ten (10) pages).

(Continued)

*Primary Examiner* — Carlos A Rivera
*Assistant Examiner* — Thuyhang Nguyen
(74) *Attorney, Agent, or Firm* — Crowell & Moring LLP

(57) ABSTRACT

This invention provides a gas turbine power generation equipment adapted to prevent step out of an electric power generator due to a system trouble such as a momentary power failure in a local grid including intermittent renewable energy generation equipment and the gas turbine power generation equipment. The gas turbine power generation equipment that supplies electric power in cooperation with the intermittent renewable energy generation equipment in the local grid interconnected to a power grid includes: a fuel flow control valve that controls a flow rate of fuel supplied to a combustor; a bleed valve or inlet air flow control valve that controls a flow rate of air compressed by a compressor and supplied to the combustor; and a control unit configured so that if voltage on the power grid decreases below a threshold V(t), the control unit outputs a control signal to at least one of the fuel flow control valve, the bleed valve, and the inlet air flow control valve. The control unit thereby (Continued)

reduces instantaneously at least one of the fuel flow rate and the compressed air flow rate. After an elapse of a predetermined time, the control unit instantaneously returns the reduced flow rate to its original level.

5 Claims, 7 Drawing Sheets

(51) Int. Cl.
    *F02C 9/46*     (2006.01)
    *F02C 9/52*     (2006.01)
    *F02C 9/54*     (2006.01)
    *F01D 15/10*     (2006.01)
    *H02P 9/10*     (2006.01)

(52) U.S. Cl.
    CPC .............. *F02C 9/52* (2013.01); *F02C 9/54* (2013.01); *H02P 9/105* (2013.01); *F05D 2270/091* (2013.01)

(56) References Cited

U.S. PATENT DOCUMENTS

| | | | |
|---|---|---|---|
| 7,707,814 B2 * | 5/2010 | Sonoda | F02C 9/28 |
| | | | 60/243 |
| 2005/0279095 A1 * | 12/2005 | Goldman | F01K 13/00 |
| | | | 60/641.8 |
| 2008/0215187 A1 * | 9/2008 | Lasseter | H02P 9/04 |
| | | | 700/282 |
| 2010/0032964 A1 | 2/2010 | Hoffmann et al. | |
| 2011/0068576 A1 * | 3/2011 | Meier | H02P 9/04 |
| | | | 290/7 |

OTHER PUBLICATIONS

International Search Report (PCT/ISA/210) dated Jan. 15, 2013, with English translation (Four (4) pages).

Supplementary European Search Report issued in counterpart European Application No. 12888058.0 dated Jun. 28, 2016 (7 pages).

* cited by examiner

GAS TURBINE POWER GENERATION EQUIPMENT

TECHNICAL FIELD

The present invention relates to gas turbine power generation equipment which a local grid in an power grid is constructed of in cooperation with intermittent renewable energy generation equipment.

BACKGROUND ART

Power grids are electric networks including power generation equipment, substation equipment, switchgear equipment, and loads, to generate power and supply the power from the power generation equipment to the loads. The power generation equipment of a power grid comes in various forms in accordance with particular kinds of energy sources used to generate electricity. Among the various types of power generation equipment, intermittent renewable energy generation equipment, including wind power, photovoltaics, geothermal energy, biomass energy, or other renewable energy, is estimated to significantly increase in percentage terms in the near future. Since the intermittent renewable energy generation equipment contains elements prone to cause instability of the respective power grids, these facilities need to incorporate a variety of measures for assuring quality of the electric power supplied from the power grids.

JP 4053965 B, for example, discloses a method of controlling a local grid obtained by interconnecting, as power supply equipment, a wind power generator and a photovoltaic generator (intermittent renewable energy), a gas/diesel power generator (a power device with low environmental acceptability), and a gas turbine power generator (a power device with high environmental acceptability), and further interconnecting, as a thermoelectric load, a wide-area small-power load (e.g., a unit of houses) and a centralized power load (e.g., an office building). The control method described in JP No. 4053965 is a technique intended to realize stable operation of a power grid under irregular power supply from the intermittent renewable energy. In this conventional control method, if a power demand exceeds the amount of power generated by the wind power generator and photovoltaic generator, the gas/diesel power generator and the gas turbine power generator are started up to initially supply power from the gas/diesel power generator and subsequently start using power from the gas turbine generator. In the event that the power demand further increases afterwards, a switchgear is closed to make power be supplied from a busbar. The gas turbine generator is operated in this way to meet a particular thermal load demand and then supply necessary amount of heat from an heat recovery system to a heat transport facility.

If intermittent renewable energy generation equipment is present in the power grid, a system disturbance such as a momentary power failure could result in simultaneous parallel off of all pieces of the intermittent renewable energy generation equipment from the power grid. This kind of event can be a big obstacle to stable operation of power grids when intermittent renewable energy generation equipment proliferates in greater quantities. For this reason, intermittent renewable energy generation equipment will be required to have, as a system interconnection requirement, a fault-ride-through (FRT) capability that causes no simultaneous parallel off in case of a system disturbance such as a momentary power failure. The equipment satisfying such a requirement is expected to be of high demand in the future.

A technique associated with the above requirement is proposed in JP 2005-51867 A, the patent of which is intended to provide a wind power generating system capable of preventing acceleration step out (loss of synchronism) and power instability, both due to system troubles, and achieving continued stable supply of electric power. The particular wind power generating system includes an induction generator, detection devices, an alternating-current energization generator, and a control device. The induction generator generates electricity from a rotating force based on wind power. The detection devices detect a rotating speed and voltage of the generator. The alternating-current energization generator connected in parallel to the induction generator is adapted to control reactive power when necessary. The control device performs secondary excitation control of the alternating-current energization generator at a time of the detection of an abnormal rotating speed or voltage by at least one of the detection devices. In case of abnormality, the generating system feeds reactive power into the induction generator to control the generator to operate at stabilized rotating speed and voltage.

PRIOR ART DOCUMENTS

Patent Documents

Patent Document 1: JP 4053965 B
Patent Document 2: JP 2005-51867 A

SUMMARY OF THE INVENTION

Problems to be Solved by the Invention

With the foregoing background, intermittent renewable energy generation equipment (e.g., power generation equipment including a wind power generator and a photovoltaic generator) and gas turbine power generation equipment high in load follow-up performance are combined to assure power quality in a local grid interconnected to a power grid.

In the power grid including an interconnected local grid of this kind, in case of an unpredicted trouble such as a momentary power failure, it will be necessary in terms of power quality assurance in the power grid that parallel-off-free operation of the gas turbine power generation equipment be continued in addition to avoidance of simultaneous parallel off of all pieces of the intermittent renewable energy generation equipment from the system.

An object of the present invention is to provide a gas turbine power generation equipment adapted to prevent generators step-out in case of a momentary power failure or other system troubles in a local grid equipped with intermittent renewable energy generation equipment and the gas turbine power generation equipment.

Means for Solving the Problems

The present invention intended to achieve the above object provides a gas turbine power generation equipment for supplying electric power in cooperation with intermittent renewable energy generation equipment in a local grid interconnected to a power grid. The gas turbine power generation equipment including: a fuel flow control device that controls a flow rate of fuel supplied to a combustor; an air flow control device that controls a flow rate of air compressed by a compressor and supplied to the combustor;

and a control unit configured so that if voltage on the power grid decreases below a threshold, the control unit outputs a control signal to at least one of the fuel flow control device and the air flow control device. The control unit thereby reduces at least one of the fuel flow rate and the compressed air flow rate instantaneously. After an elapse of a predetermined time, the control unit instantaneously returns the reduced flow rate to its original level.

Effect of the Invention

The present invention prevents generators step out under system troubles so that total simultaneous parallel off of the gas turbine power generation equipment from the system is avoided.

MODES FOR CARRYING OUT THE INVENTION

Hereunder, embodiments of the present invention will be described with reference to the accompanying drawings.

Figure 1:
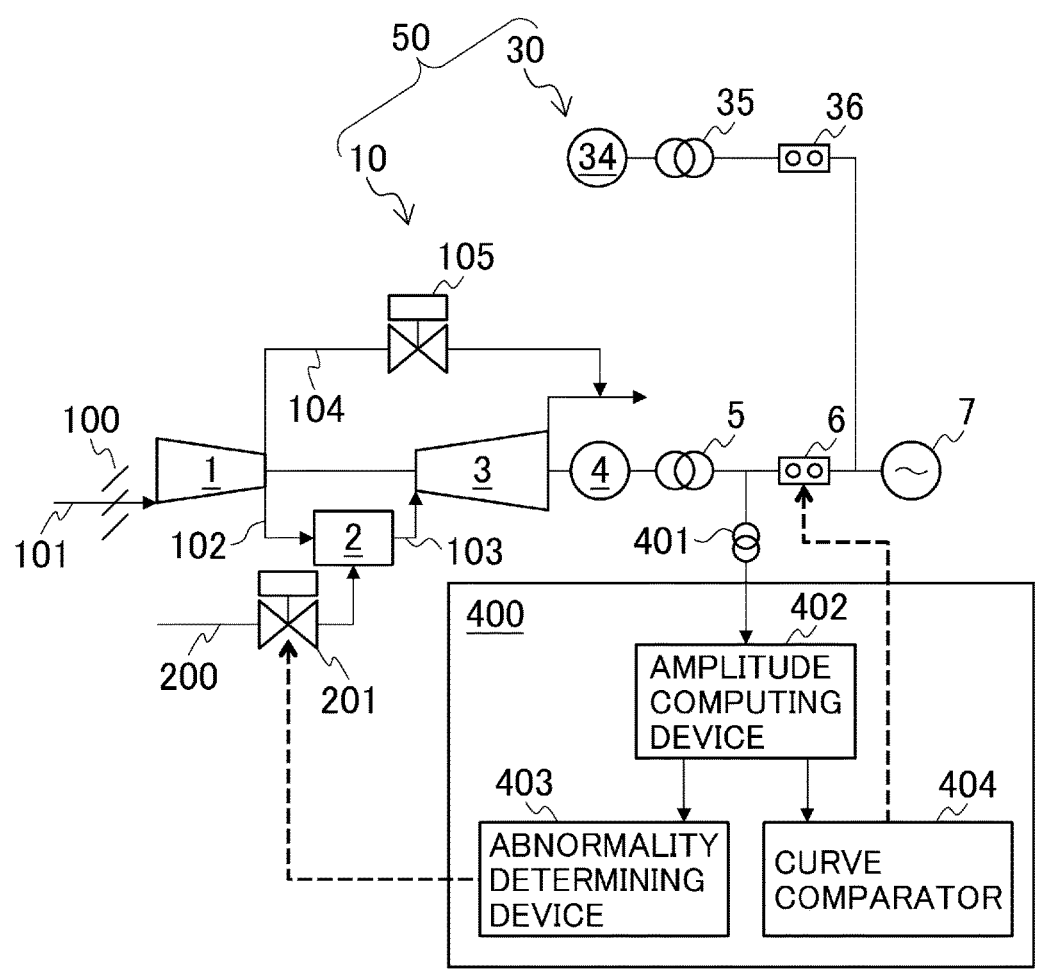
FIG. 1 is a system flow diagram showing an overall configuration of a gas turbine power generation equipment according to a first embodiment of the present invention.

FIG. 1 is a system flow diagram showing an overall configuration of a gas turbine power generation equipment according to a first embodiment of the present invention. A gas turbine power generation equipment 10 and intermittent renewable energy generation equipment 30 shown in the figure are included in a local grid 50 interconnected to a power grid 7.

The intermittent renewable energy generation equipment 30 uses renewable energy to generate electricity. A supply source of the electric power thus obtained is shown as a power supply 34 (such as a power generator or battery) in FIG. 1. The power supply 34 is connected to the power grid 7 via a transformer 35 and a disconnecting switch 36. The renewable energy can be wind power, the geothermal power, or solar energy, but the type of energy is not limited to these. In addition, although FIG. 1 shows an example in which the local grid includes only one gas turbine power generation equipment 30, a plurality of facilities 30, each interconnected to the power grid 7, may be employed as well.

The gas turbine power generation equipment (gas turbine plant) 10 includes: a gas turbine compressor 1 that compresses air 101 (atmospheric air) and creates high-pressure combustion air 102; a gas turbine combustor 2 that creates combustion gases 103 by burning fuel 200 together with the compressed air 102 introduced from the compressor 1; a turbine 3 into which the combustion gases 103 that the combustor 2 has created are introduced; a power generator 4 driven by the turbine 3 to generate electricity; and a control unit 400 that executes various processes relating to the gas turbine power generation equipment 10.

The compressor 1 and the generator 4 are both mechanically coupled to the turbine 3. The turbine 3 that has been rotationally driven by the combustion gases 103 drives the compressor 1 and the generator 4. The generator 4 is connected to the power grid 7 via a cable, with a transformer 5 and a disconnecting switch 6 being placed on the cable line. The power that the generator 4 has generated is converted into a predetermined voltage by the transformer 5 and supplied to the power grid 7 (load) via the disconnecting switch 6. A control signal is input from the control unit 400, that is, a fault-ride-through (FRT) curve comparator 404 described later herein, to the disconnecting switch 6, switching of which is appropriately controlled in accordance with the control signal. An instrument transformer 401 is placed in parallel to the transformer 5, closer to the generator 4 than to the disconnecting switch 6, on the cable line. The instrument transformer 401 is a device used to detect a voltage on the power grid 7, and the voltage on the power grid 7 that the instrument transformer 401 has detected is output to an amplitude computing device 402 described later of the control unit 400.

The gas turbine power generation equipment 10 further includes a fuel flow control valve 201, an inlet air flow control valve 100, and a bleed valve 105. The fuel flow control valve 201, disposed to control a flow rate of the fuel supplied to the combustor 2, is placed in a fuel system 200 for supplying the gas turbine fuel to the combustor 2. A valve-opening angle change of the fuel flow control valve 201 controls the flow rate of fuel induced into the combustor 2, and thus controls a generated-electricity output of the gas turbine. The generated-electricity output control of the gas turbine allows compensation for a change in output of the intermittent renewable energy generation equipment 30 for stabilized system operation. A control signal is input from the control unit 400 to the fuel flow control valve 201, a valve angle of which is controlled in accordance with the control signal.

The inlet air flow control valve 100, used to control a flow rate of the air taken into the compressor 1, is placed at a suction (inlet) end of the compressor 1. A valve-opening angle change of the air flow control valve 100 controls the flow rate of the air induced into the compressor 1 for compression, and thereby controls the flow rate of the compressed air to be induced into the combustor 2. The flow rate control by the inlet air flow control valve 100 is conducted primarily during a start-up of the compressor 1. A control signal is input from the control unit 400 to the inlet air flow control valve 100, a valve angle of which is controlled in accordance with the control signal. While the inlet air flow control valve 100 is shown and described here by way of an example as an inlet air flow control device of the compressor 1, the control unit 400 may control a valve angle of an inlet guide vane placed in plurality at the suction (inlet) end of the compressor 1. In this case, a control signal from the control unit 400 will be output to a driving source relating to an inlet guide vane driving mechanism (e.g., at least one of a gear driving mechanism from the driving source and a linkage mechanism), and a valve angle of at least one of the inlet guide vanes may be controlled in accordance with the control signal.

The bleed valve 105, used to control a bleed flow rate of discharge air during a time from its discharge from the compressor 1 to its arrival at the combustor 2, is disposed in a bypass flow pathway (bleed system) 104 for detouring a portion of the discharge air after the air existing the compressor 1, around the combustor 2 and the turbine 3. The bleed system 104 is a pipeline connecting a discharge end of the compressor 1 and a downstream of the turbine 3. A valve angle change of the bleed valve 105 controls the amount of compressed air to be bled off, whereby the flow rate of the compressed air for induction into the combustor 2 is adjusted. The bleed air flow rate is controlled with the use of the bleed valve 105 for the purpose of pressure control primarily during the start-up of the compressor 1. A control signal is input from the control unit 400 to the bleed valve 105, and a valve angle of the bleed valve 105 is controlled in accordance with the control signal.

The control unit 400 will now be described. The control unit 400 shown in FIG. 1 includes an amplitude computing device 402, an abnormality determining device 403, and an FRT curve comparator 404.

The amplitude computing device 402 is a section that executes a computing process for time-varying amplitude of the voltage in the power grid 7, the computing process being based on the voltage on the power grid 7 that has been output from the instrument transformer 401. The voltage amplitude of the power grid that has been calculated here is output to the abnormality determining device 403 and the FRT curve comparator 404.

The abnormality determining device 403 is a section that executes the process of determining whether an abnormality has occurred in the power grid 7 (at a downstream side of the generator 4), the determination being based on a voltage 'v' that is input from the amplitude computing device 402. More specifically, if the voltage 'v' suddenly decreases below a predetermined threshold V0 within a predetermined time, this state is determined to be abnormal; if the voltage 'v' is higher than the threshold V0, this state is determined to be normal. After determining from the voltage 'v' that an abnormality has occurred, the abnormality determining device 403 outputs to the fuel flow control valve 201 a control signal for immediate closing and then opening of the fuel flow control valve 201 (more specific changes in fuel flow rate, based on the control signal, will be described later herein).

The threshold V0 (see FIG. 3 described later) represents a value determined allowing for a more specific mode of change that the voltage on the power grid 7 exhibits if a momentary power failure of the power grid 7 follows an abnormality such as partial short-circuiting due to lightning or the like. The threshold V0 may be a fixed level or value as shown by way of example in FIG. 3 or may be a level or value having a predetermined range.

The FRT curve comparator 404 is a section that executes the process of determining whether a persistent abnormality is occurring based on a voltage 'v' developed after the determination of an abnormality by the abnormality determining device 403. In this process, if the persistent abnormality is determined to be occurring, the FRT curve comparator 404 outputs to the disconnecting switch 6 a control signal for opening the disconnecting switch 6, and thereby electrically isolates the generator 4 from the power grid 7.

Figure 3:
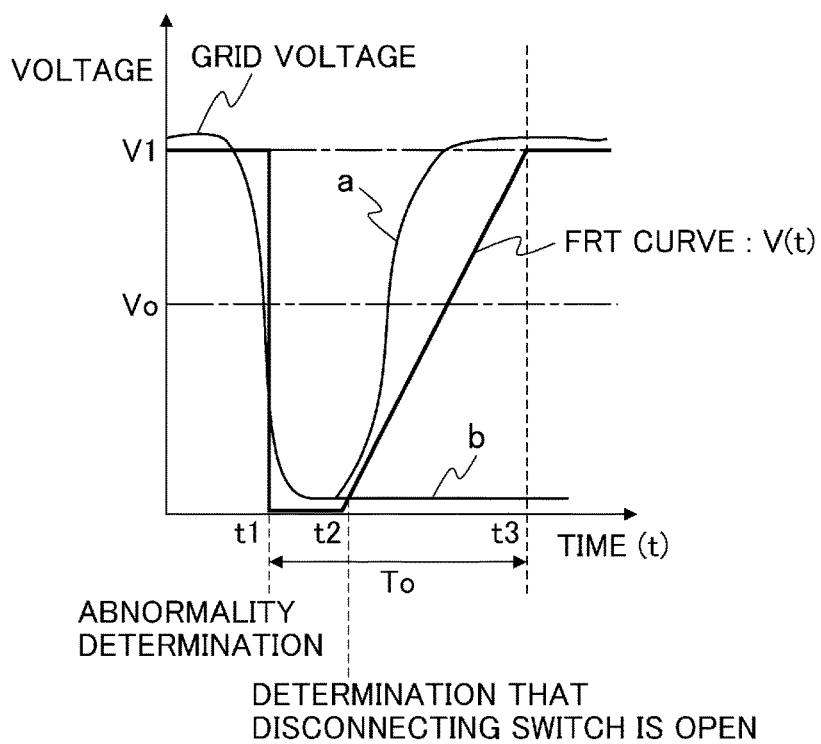
FIG. 3 is a diagram showing an example of changes in voltage of a power grid 7 with time.

The FRT curve comparator 404 in the present embodiment defines the threshold relating to the above determination in terms of V(t) that is a function of time 't', and performs the determination process in a manner that depends on whether the voltage 'v' is likely to reach a value less than the threshold, as shown in FIG. 3 that follows. Hereinafter, the function V(t) that serves as the threshold in the example of FIG. 3 may be termed the FRT (Fault-Ride-Through) curve. The FRT here refers to a function or ability of the gas turbine power generation equipment 10 to continue to operate without causing parallel off even in case of a voltage fluctuation or frequency fluctuation due, for example, to a momentary power failure or some other system trouble. The FRT curve should be constructed as meaning a voltage range in which continued operation can be achieved even in case of system trouble.

The control unit 400 includes the following elements in its hardware configuration: an arithmetic processing unit (e.g., CPU) that is not shown, the arithmetic processing unit being provided to execute various control programs including the control described later herein; a storage device for storing the control programs and other data, such as a semiconductor memory (ROM and/or ROM); a magnetic storage device (not shown) such as a disk drive; and an input/output device (not shown) to/from which various data will be input/output. Arithmetic circuits 402 and 403 shown in FIG. 1 do not need to be separate elements. One certain computing device may have, for example, two arithmetic circuit functions or more.

Figure 2:
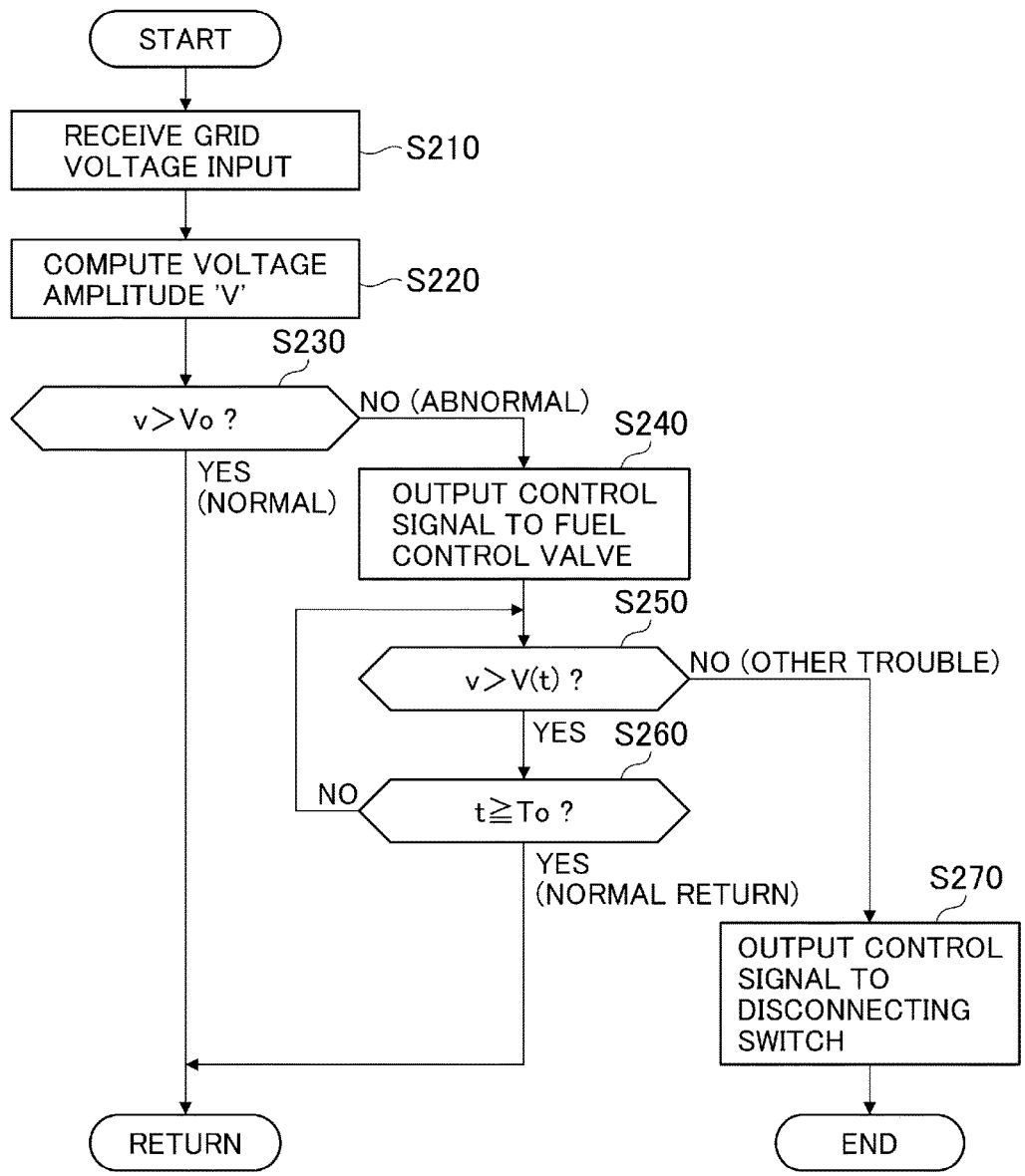
FIG. 2 is a flowchart of a control process executed by a control unit 400 relating to the gas turbine power generation equipment shown in FIG. 1.

The control that the gas turbine power generation equipment 10 having the above configuration executes will now be described with reference being made to part of the accompanying drawings. FIG. 2 is a flowchart of a control process executed by the control unit 400 relating to the gas turbine power generation equipment 10 shown in FIG. 1, and FIG. 3 is a diagram showing an example of changes in the voltage on the power grid 7 with time. A horizontal axis in FIG. 3 denotes an elapsed time (t), and a vertical axis represents the system voltage (v).

After a start of the process shown in FIG. 2, the amplitude computing device 402 first receives a voltage value of the power grid 7 that is input from the instrument transformer 401 (step S210), and then computes voltage amplitude 'v' of the power grid 7 from the input value (step S220). Next, the amplitude computing device 402 outputs the computed voltage amplitude 'v' to the abnormality determining device 403 and the FRT curve comparator 404.

In step S230, the abnormality determining device 403 that has received the voltage amplitude 'v' determines whether the voltage amplitude 'v' is greater than or equal to the threshold V0. If the voltage 'v' is higher than or equal to the threshold V0, the abnormality determining device 403 determines the voltage on the power grid 7 to be normal. The control unit 400 then returns process control to the first step and repeats the process from step S210 onward. Conversely if the voltage 'v' is less than the threshold V0, the abnormality determining device 403 determines the voltage on the power grid 7 to have become abnormal (e.g., part of the power grid 7 to have become short-circuited by reason of lightning to cause a momentary power failure). This state is illustrated in the example of FIG. 3, in which the system voltage 'v', although held normal until immediately before time 't1', suddenly decreases below V0 at time 't1' and the abnormality determining device 403 determines that voltage change to be abnormal.

If in step S230 the abnormality is determined to have occurred, the abnormality determining device 403 outputs a control signal to the fuel flow control valve 201 so that this control valve immediately closes and then opens (step S240). These immediate closing and opening actions should be construed as referring to operation of the valve to instantaneously close to a predetermined angle position during the abnormality determination in step S230, and then after an elapse of a predetermined time, instantaneously open to a predetermined angle (the immediate valve opening and closing actions described later herein should be construed to mean the opposite). Further details of the control signal (flow rate command value) sent to the fuel flow control valve 201 in step S240 will be described below referring to part of the accompanying drawings.

Figure 4:
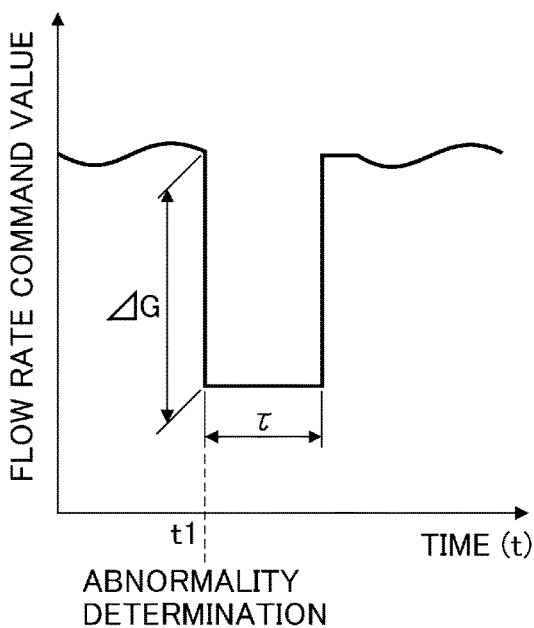
FIG. 4 is a graph representing an example of a control signal which is output in step S240 from an abnormality determining device 403 to a fuel flow control valve 201.

FIG. 4 is a graph representing an example of a control signal which is output in step S240 from the abnormality determining device 403 to the fuel flow control valve 201. A horizontal axis in FIG. 4 denotes an elapsed time, and a vertical axis denotes the flow rate of the gas turbine fuel. As shown in the figure, at time 't1' of the abnormality determination, the immediate closing/opening signal to the fuel flow control valve 201 is first immediately set to be a value smaller by $\Delta G$ than the flow rate command value operative during normal operation before the abnormality determination is made. The set command value is subsequently held for a predetermined control time of $\tau$[sec]. After an elapse of $\tau$[sec], the command value is immediately returned to the flow rate command value operative before the abnormality determination.

In terms of preventing step out of the generator 4, $\Delta G$ should be set to be as large as possible. Conversely, in terms of preventing flame extinction in the combustor 2, $\Delta G$ should be set to be as small as possible. To obtain maximum prevention effects against the flame extinction and step out, therefore, it is preferable that $\Delta G$ be changed in accordance with particular magnitude of the flow rate command value set before the abnormality determination. More specifically, $\Delta G$ takes a relatively large value for a relatively large flowrate command value set before the abnormality determination is made; $\Delta G$ takes a relatively small value for a relatively small flowrate command value. While the above-described setting of the flow rate under the abnormality is based on the flow rate operative before the abnormality determination, it goes without saying that the flow rate operative under the abnormality may be set independently of the flow rate operative before the abnormality determination. For example, a minimum flow rate command value effective for preventing flame extinction may be determined beforehand so that irrespective of the magnitude of the flow rate command value set before the abnormality determination, the flow rate will be controlled to a level above that minimum command value to prevent the loss of the flame.

It should also be appreciated that a time during which the step out prevention effect becomes a maximum is set as the control time $\tau$ in FIG. 4 beforehand. The time should be set in consideration for both a duration of a momentary power failure (i.e., a time required for recovery from a power failure) and response delay characteristics that the turbine 3 exhibits before the flow rate command (control signal) to the fuel flow control valve 201 appears as a change in a speed of the turbine 3. This will allow sequential prevention of a momentary power failure exhibiting a significantly quick behavior compared to the response delay characteristics of the turbine 3.

When the flow rate of fuel is controlled as described in steps S210 to S240, the output from the gas turbine only during a power failure can be suppressed and after voltage restoration the output can be returned to its original level at once. This suppresses an increase in internal rotational energy (i.e., overspeed) of the gas turbine that does not enable the turbine to release energy under a momentary power failure, and thus helps prevent the generator 4 from entering a step out state. The above further allows desired energy to be output from the gas turbine when the voltage is restored. In other words, in accordance with the present embodiment, the parallel off of the gas turbine power generation equipment from the system can be avoided under a momentary power failure, and compensation for any output fluctuations in the intermittent renewable energy generation equipment 30 can be continued. Thus the system stabilizes.

Even if the process is terminated with completion of step S240, a momentary power failure still can be prevented. In the present embodiment, the following process is further executed with other system trouble being envisaged as well.

After step S240, in step S250 the FRT curve comparator 404 determines whether the voltage amplitude 'v' is greater than a threshold V(t). In the example of FIG. 3, the threshold V(t) denotes an FRT curve represented by a thick solid line. The threshold V(t) in the example of FIG. 3 is held at a predetermined time of zero from time 't1' of the abnormality determination. Thereafter, the level V(t) increases monotonously or monotonically in a linear form until time 'V3' is reached.

If in step S250 the FRT curve comparator 404 determines the voltage 'v' to be less than the threshold V(t), the comparator 404 then determines the operation to be not continuable because of an abnormality being persistent, and outputs a control signal to the disconnecting switch 6 so that the switch 6 is opened (step S270). Thus the disconnecting switch 6 is opened and the gas turbine power generation equipment 10 is isolated from the power grid 7. The process is terminated with an end of step S270.

Thin solid line 'b' in FIG. 3 denotes an example in which, although a momentary power failure occurs at time 't1' and the fuel flow rate control shown in step S240 and FIG. 4 is performed, the voltage does not return to its normal level even after that. Thin solid line 'b' crosses the FRT curve at time 't2'. To be more specific, at time 't2', the FRT curve comparator 404 determines the voltage 'v' to be less than the threshold V(t), thereby determining that a system trouble other than a momentary power failure has occurred. The disconnecting switch 6 is then opened and the gas turbine power generation equipment 10 is isolated from the system 7. In this way, the present embodiment allows the gas turbine to be protected from system troubles other than a momentary power failure.

Conversely if in step S250 the FRT curve comparator 404 determines that the voltage 'v' is higher than or equal to the threshold V(t) and that a normal return of the system voltage is continued, the FRT curve comparator 404 subsequently determines whether an elapsed time of 't–t1' from the abnormality has reached a predetermined time T0 (step S260). If in step S260 the FRT curve comparator 404 determines that the elapsed time from the abnormality does not yet reach time T0, the comparator 404 returns to step S250 and compares the voltage 'v' with the threshold V(t) once again. Conversely if time T0 is determined to have been reached, the comparator 404 determines the voltage on the power grid 7 to have properly returned to normal (the abnormality to have been corrected). The comparator 404 then returns to the first step and repeats the process from step S210 onward.

The process from step S250 to step S260 will now be described while citing an example of system voltage changes that is shown as thin solid line 'a' in FIG. 3. In this example of FIG. 3, the momentary power failure at time 't1' causes the voltage 'v' to temporarily decrease below V0. After 't1', the fuel flow rate control shown in step S240 and FIG. 4 causes the voltage to return to a near-V1 level reached before the abnormality occurred. During this voltage return, since the system voltage 'v' rises earlier than the FRT curve serving as the threshold V(t), the gas turbine properly returns to normal without being determined in step S250 to be abnormal.

Time T0 in step S260 denotes the time during which the FRT curve comparator 404 repeats the abnormality determination relating to step S250, time T0 also denoting a duration of continued threshold V(t) usage from the start of the abnormality determination. For this reason, it suffices only if the FRT curve, serving as the threshold V(t), is defined so as to cover time T0 ranging from time 't1' to time 't3'. In addition, as counted from time 't1' when the momentary power failure occurred, the time required for the system voltage to return to a voltage level (almost V1) that was reached prior to the power failure is used as an indication of the setting of time T0. Time T0 in the example of FIG. 3 represents the time that the FRT curve defined in FIG. 3 takes to return from the voltage level reached when the abnormality determination was made to the level reached before the abnormality determination.

While the FRT curve is used as the threshold V(t) in the example of FIG. 3, the threshold V(t) is not limited to the FRT curve. In addition, in terms of confirming that the system voltage 'v' is recovering along the FRT curve with the elapse of time, the threshold to be used in step S250 is represented by a function of time in the example of FIG. 3, but the threshold does not need to be represented by the function of time. That is to say, it suffices only if the fact that after the elapse of the predetermined time from the abnormality, the system voltage is back at nearly the voltage level reached before the abnormality can be confirmed. If the voltage amplitude 'v' detected after the elapse of the predetermined time from the abnormality has reached a value close to or greater than the value reached before the abnormality occurred, then the voltage amplitude may be determined to have properly returned to normal. To put this in a different perspective using the example shown in FIG. 3, it suffices just to determine whether the voltage 'v' is higher than or equal to V1 at time 't3' after time T0 has passed from time 't1' when the abnormality occurred.

Figure 5:
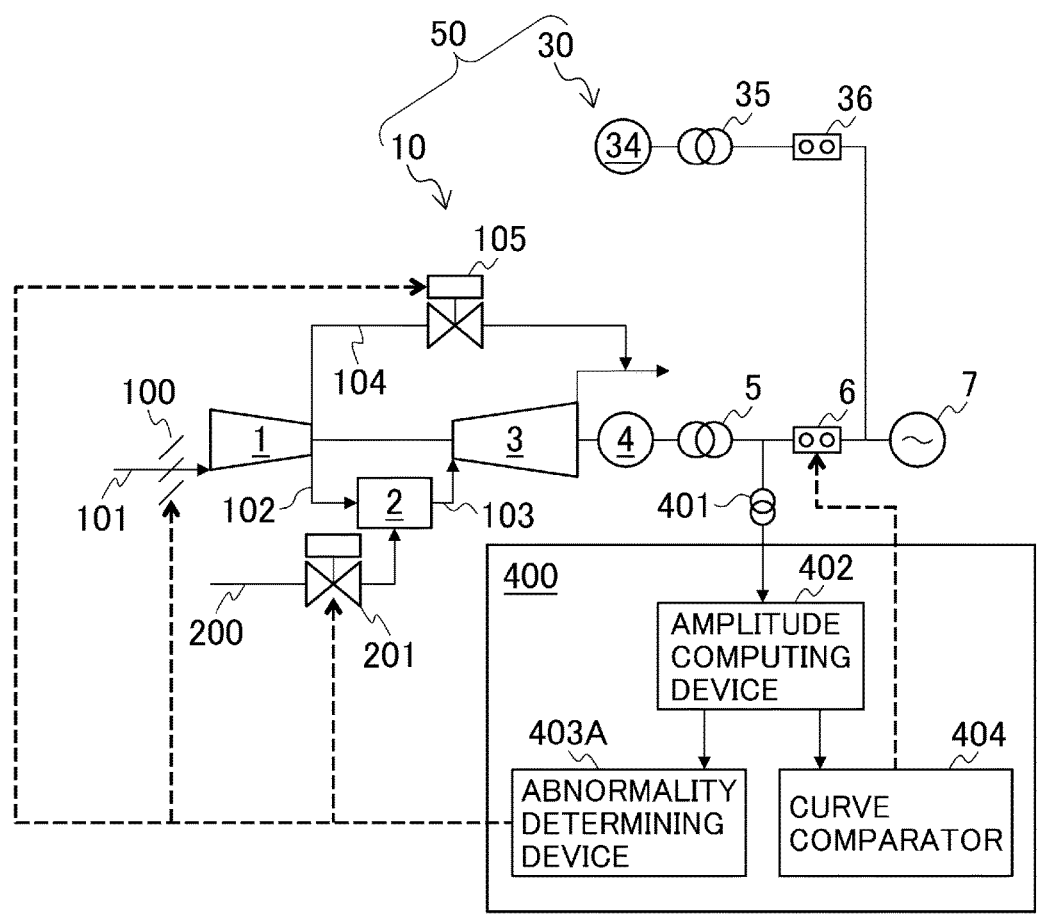
FIG. 5 is a system flow diagram showing an overall configuration of a gas turbine power generation equipment according to a second embodiment of the present invention.

A second embodiment of the present invention will now be described with reference to FIGS. 5 and 6. FIG. 5 is a system flow diagram showing an overall configuration of a gas turbine power generation equipment according to the second embodiment of the present invention. The same elements as used in earlier figures are each assigned the same reference number and description of these elements may be omitted (the same also applies to figures that follow).

An abnormality determining device 403A of the gas turbine power generation equipment shown in FIG. 5 is configured so that if an abnormality is determined to have occurred based on a voltage 'v', the device 403A outputs control signals to a fuel flow control valve 201 and a bleed valve 105 or an inlet air flow control valve 100. That is to say, the present embodiment differs from the first embodiment in that in addition to the fuel flow control valve 201, the bleed valve 105 or the inlet air flow control valve 100 is used as a subject of control in step S240 executed after the abnormality determining device 403A made an abnormality determination in step S230 of the flowchart of FIG. 2.

Figure 6:
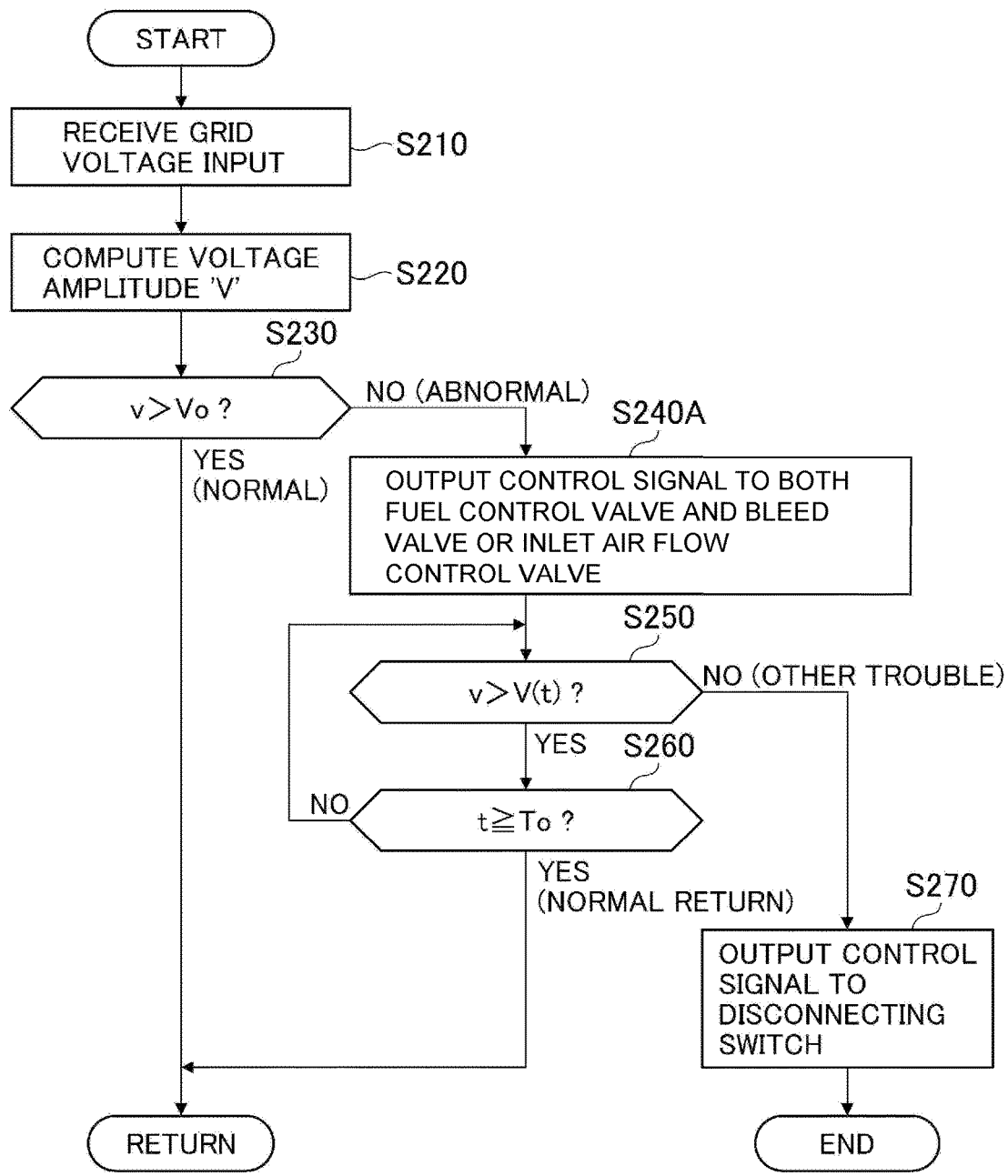
FIG. 6 is a flowchart of a control process executed by a control unit 400 relating to the gas turbine power generation equipment shown in FIG. 5.

FIG. 6 is a flowchart of a control process executed by a control unit 400 relating to the gas turbine power generation equipment shown in FIG. 5. The flowchart shown in FIG. 6 is substantially the same as that of FIG. 2 except for step S240A. The description of all process steps except for S240A is thus omitted.

If in step S230 the abnormality determining device 403A determines that the voltage 'v' is less than a threshold VO and that an abnormality has occurred in a power grid 7, the abnormality determining device 403A subsequently outputs a control signal to the fuel flow control valve 201 so that this control valve immediately closes and then opens. Simultaneously, the abnormality determining device 403A outputs a control signal to the bleed valve 105 so that this valve immediately opens and then closes (step S240A). The control signal to the bleed valve 105, as with the control signal of FIG. 4 that is addressed to the fuel flow control valve 201, is set to an appropriate value to enable continued operation even under a momentary power failure. Additionally, the present embodiment assumes that an increment in the amount of air to be bled off during the control (i.e., a value corresponding to ΔG) is set with flame extinction and step out prevention effects taken into account. On top of that, a time over which the amount of air to be bled off increases (i.e., a value corresponding to τ) is set with both a duration of a power failure and response delay characteristics taken into account.

When the fuel flow control valve 201 and the bleed valve 105 are controlled in that manner, as shown in FIG. 4 a ratio between a flow rate of fuel and that of combustion air in a combustor 2 suddenly decreases and then returns to an original level, and the flow rate of the combustion air 102 passing through the combustor 2 suddenly decreases and then returns to an original level. Compared with a case in which the bleed valve 105 is not operated, the change in the ratio between the flow rate of fuel and that of the combustion air in the combustor 2 becomes small and stability of the flame improves. In addition, a flow rate of any combustion gases flowing into a turbine 3 suddenly decreases, which enhances a suppression effect against gas turbines overspeed, compared with the case where the bleed valve 105 is not operated. Step out of a generator 4 can therefore be prevented, and thus, stable operation of a system equipped with intermittent renewable energy generation equipment 30 can be continued.

Furthermore, in step S240A, if the inlet air flow control valve 100 is immediately closed and then opened instead of the bleed valve 105 being operated, the flow rate of the air 102 can be returned to an original level after the flow rate of the combustion air 102 passing through the combustor 2 has suddenly decreased. The control signal to the inlet air flow control valve 100, as with the control signal of FIG. 4 that is addressed to the fuel flow control valve 201, is set to an appropriate value to enable continued operation under a momentary power failure. Additionally, the present embodiment assumes that a decrement in a flow rate of the air taken in during the control (i.e., a value corresponding to ΔG) is set with the flame extinction and step out prevention effects taken into account. On top of that, a time over which the amount of air to be bled off decreases (i.e., a value corresponding to τ) is set with both the duration of a power failure and response delay characteristics taken into account.

Thus, compared with a case in which the inlet air flow control valve 100 is not operated, the change in the ratio between the flow rate of fuel and that of the combustion air in the combustor 2 becomes small and the stability of the flame can be improved. In addition, the flow rate of the combustion gases flowing into the turbine 3 suddenly decreases, which enhances the suppression effect against gas turbine overspeed, compared with the case where the inlet air flow control valve 100 is not operated. The step out of the generator 4 can therefore be prevented, and thus the stable operation of the system equipped with the intermittent renewable energy generation equipment 30 can be continued.

Figure 7:
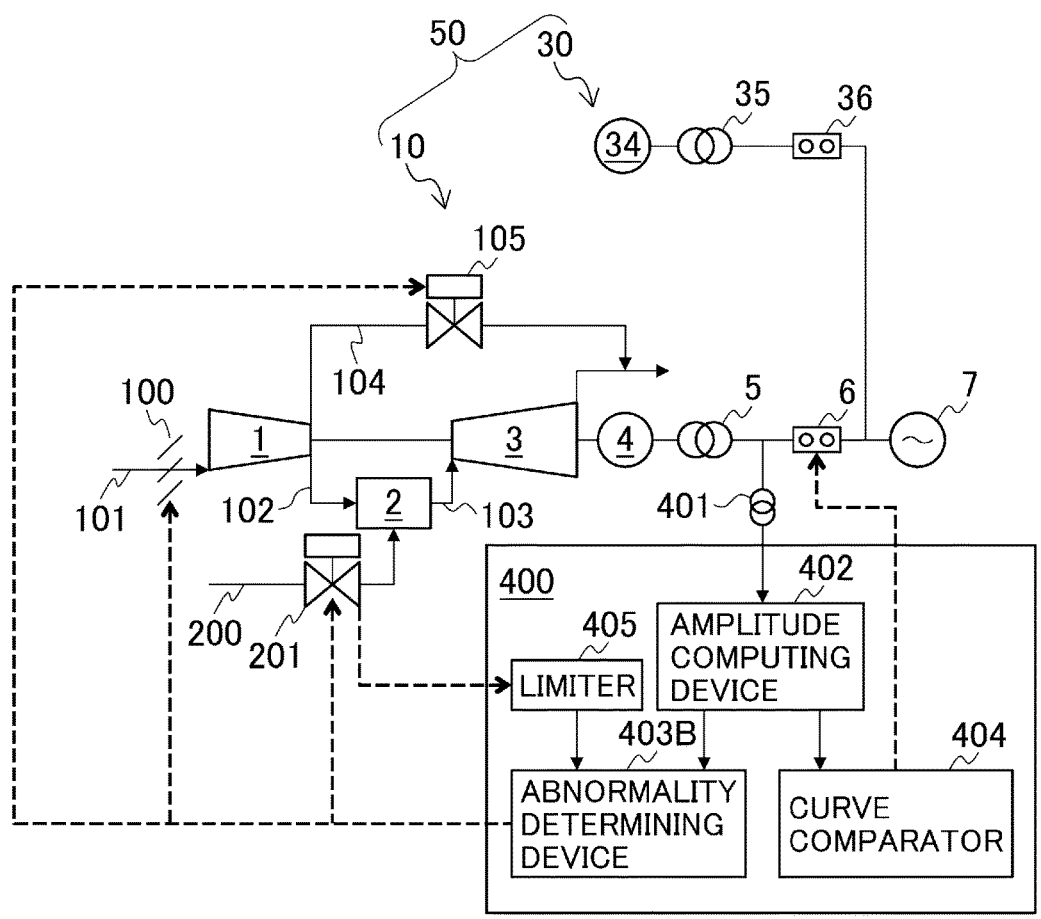
FIG. 7 is a system flow diagram showing an overall configuration of a gas turbine power generation equipment according to a third embodiment of the present invention.

A third embodiment of the present invention will now be described with reference to FIGS. 7 and 8. FIG. 7 is a system flow diagram showing an overall configuration of a gas turbine power generation equipment according to the third embodiment of the present invention.

A control unit 400 in the gas turbine power generation equipment shown in FIG. 7 includes a limiter 405 that receives from a fuel flow control valve 201 an input signal indicating an angle 'd' of the fuel flow control valve 201, and an abnormality determining device 403B that receives a determination result (described later herein) as one of input signals from the limiter 405.

Figure 8:
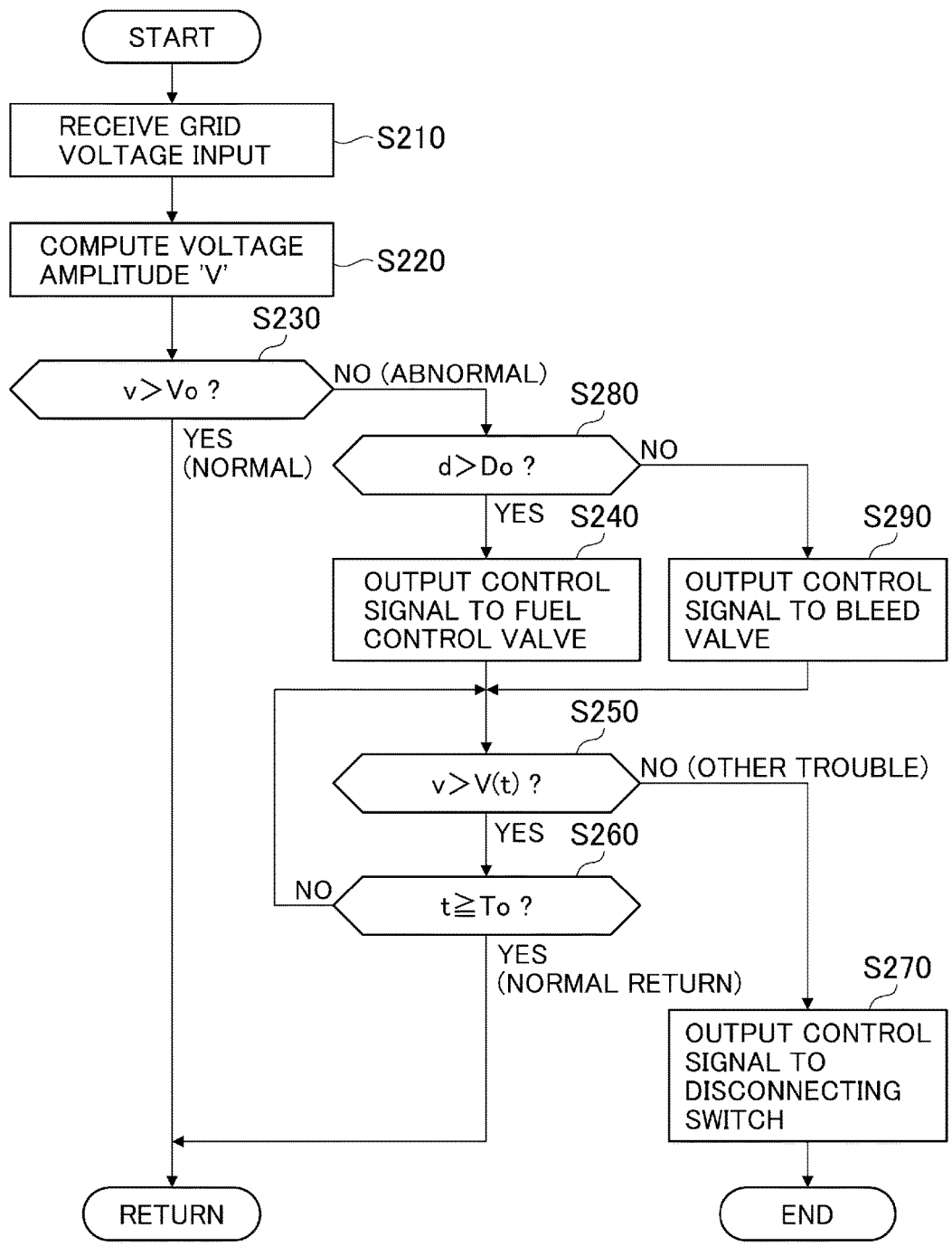
FIG. 8 is a flowchart of a control process executed by a control unit 400 relating to the gas turbine power generation equipment shown in FIG. 7.

FIG. 8 is a flowchart of a control process executed by the control unit 400 relating to the gas turbine power generation equipment shown in FIG. 7. The flowchart shown in FIG. 8 is substantially the same as that of FIG. 2, except for steps S280 and S290. The description of all process steps except for those steps is thus omitted.

If in step S230 of the flowchart of FIG. 8 the abnormality determining device 403B determines that a voltage 'v' is less than a threshold V0 and that an abnormality has occurred in a power grid 7, the limiter 405 executes the process of determining whether the angle 'd' of the fuel flow control valve 201 is greater than a threshold D0 (step S280). The threshold D0 is a value that was set for preventing flame extinction in a combustor 2. The threshold D0 may be a fixed level or value or may be a level or value having a predetermined range.

In such a case, therefore, instead of the fuel flow control valve 201 a bleed valve 105 will be used as a subject of control for the prevention of flame extinction. If the angle 'd' is determined to be below the threshold D0, the abnormality determining device 403B will output a control signal for immediate opening and then closing of the bleed valve 105 only (step S290).

When the bleed valve 105 is immediately opened and then closed in this way with the angle of the fuel flow control valve 201 kept, a flow rate of any combustion gases flowing into a turbine 3 suffers a sudden decrease but returns to normal. This suppresses an overspeed of the gas turbine, thus preventing step out of a generator 4 and consequently enabling continued stable operation of a system equipped with intermittent renewable energy generation equipment 30.

In step S290, in addition to the immediate opening and closing of the bleed valve 105 with the angle of the fuel flow control valve 201 kept, an inlet air flow control valve 100 of a compressor 1 may be immediately closed and then opened simultaneously with the immediate opening and closing of the bleed valve 105. In this case, since a flow rate of the combustion gases passing through the compressor 1 also returns to normal after suffering a sudden decrease, a balance between the fluid flow and pressure ratio in the compressor 1 can be maintained and the compressor 1 can be easily operated within its operating limits.

The simultaneous operation of the bleed valve 105 and the fuel flow control valve 201 enables stability of the flame to be maintained since the ratio of the fuel to the combustion air flow in the combustor 2 increases. Such simultaneous operation, by contrast, could increase metal temperatures of hot combustor and turbine sections.

To suppress the increases in metal temperature, therefore, the immediate closing and opening of the fuel flow control valve 201 may also be executed simultaneously with the control of the bleed valve 105 and the inlet air flow control valve 100 in step S290. If the two valves are thus controlled, the ratio of the fuel to the combustion air flow in the combustor 2 can be made so appropriate that shorter lives of the hot parts can be avoided. In addition, a suppression effect against gas turbine overspeed improves over a suppression effect obtainable if the inlet air flow control valve 100 is not operated. Step out of the generator 4 can therefore be prevented, and thus the stable operation of the system equipped with the intermittent renewable energy generation equipment 30 can be continued.

While the bleed valve 105 and the fuel flow control valve 201 have been described as different subjects of control in each of the first to third embodiments, the two valves have a common function in that both control the amount of combustion air flowing into the combustor 2. In other words, if in step S230 an abnormality is determined to have occurred, these compressed-air flow control elements (the bleed valve 105 and the inlet air flow control valve 100) may be controlled to instantaneously reduce the flow of the compressed air into the combustor 2. In this case, after the elapse of the predetermined time, the flow rate of the compressed air in the combustor 2 may be instantaneously returned to a level obtained before the flow reduction. In addition, although this is not described in the embodiments, in FIG. 2 relating to the first embodiment, if an abnormality is determined to have occurred in step S230, equivalent advantageous effects can likely be obtained by immediately closing and then opening only the inlet air flow control valve 100, instead of the fuel flow control valve 210, in step S240. Furthermore, the threshold V(t) relating to step S50 in each of the embodiments may be appropriately changed in accordance with a control mode of the element(s) to be controlled in each embodiment.

The present invention is not limited to the above embodiments and may embrace varieties of modifications without departing from the spirit of the invention. The embodiments, for example, have only been described in detail for a better understanding of the invention and are therefore not necessarily limited to the configurations containing all described constituent elements. In addition, part of the configuration of a certain embodiment may be replaced by the configuration of another embodiment and the configuration of a certain embodiment may be added to the configuration of another embodiment. Furthermore, part of the configuration of one of the embodiments may be added to, deleted from, and/or replaced by the other embodiments.

Note also that some or all of the components, functions, processors, and the like in the following embodiments can be substituted by other hardware such as an integrated circuit. Alternatively, these components and the others can be implemented by software, which is programs in computers, as well. All the information associated with the programs, data tables, files, and others that achieve those components, functions, and processors can be stored in data storage devices including a memory, hard disk, and solid state drive (SSD) or portable storage media such as an integrated circuit card (ICC), SD card, and DVD.

REFERENCE SIGNS LIST

1 . . . Compressor
2 . . . Combustor
3 . . . Turbine

4 ... Generator
5 ... Transformer
6 ... Disconnecting switch
7 ... Power grid
10 ... Gas turbine power generation equipment
30 ... Intermittent renewable energy generation equipment
50 ... Local grid
100 ... Inlet air flow control valve
101 ... Gas turbine inlet air (Atmospheric air)
102 ... Compressed air
103 ... Combustion gases
104 ... Bleed air
105 ... Bleed valve
200 ... Fuel system
201 ... Fuel flow control valve
400 ... Control unit
401 ... Instrument transformer
402 ... Amplitude computing device
403 ... Abnormality determining device
404 ... FRT curve comparator
405 ... Limiter

The invention claimed is:

1. Gas turbine power generation equipment for supplying electric power in cooperation with intermittent renewable energy generation equipment in a local grid interconnected to a power grid, the gas turbine power generation equipment comprising:
a fuel flow control device for controlling a flow rate of fuel supplied to a combustor;
an instrument transformer for detecting a voltage on the power grid;
an air flow control device for controlling a flow rate of compressed air that has been compressed by a compressor and is supplied to the combustor; and
a control unit configured to, when voltage on the power grid detected by the instrument transformer decreases below a threshold, output a control signal to at least one of the fuel flow control device and the air flow control device to decrease at least one of the fuel flow rate and the flow rate of the compressed air, and to increase a reduced flow rate of at least one of the fuel and the compressed air after an elapse of a predetermined time; wherein:
the fuel flow control device is a fuel flow control valve that controls the flow rate of fuel supplied to the combustor;
the air flow control device includes an inlet air flow control valve that controls a flow rate of air taken into the compressor, and a bleed air flow control valve disposed in a bleed system for causing a portion of the air discharged from the compressor to detour the combustor, the bleed air flow control valve controlling bleed air discharged from the compressor;
when the voltage on the power grid decreases below the threshold, the control unit outputs the control signal for at least one of immediately closing and opening the fuel flow control valve, immediately closing and opening the inlet air flow control valve, and immediately opening and closing the bleed air flow control valve; and
when the voltage on the power grid decreases below the threshold and an opening degree of the fuel flow control valve is less than a threshold, the control unit outputs control signals to immediately open and close the bleed air flow control valve and immediately close and open the inlet air flow control valve while maintaining the opening degree of the fuel flow control valve.

2. The gas turbine power generation equipment according to claim 1, further comprising
a disconnecting switch installed on a cable line connecting the gas turbine power generation equipment to the power grid; wherein
when the voltage on the power grid has been lower than the threshold for a predetermined time, the control unit outputs a control signal to open the disconnecting switch so as to electrically parallel the gas turbine power generation equipment off from the power grid.

3. The gas turbine power generation equipment according to claim 1, wherein
when the voltage on the power grid decreases below the threshold, an opening degree of at least one of the fuel flow control valve, inlet air flow control valve, and bleed air flow control valve controlled and a time to control the opening degree of at least one of the fuel flow control valve, the inlet air flow control valve, and the bleed air flow control valve are both set in advance.

4. The gas turbine power generation equipment according to claim 1, wherein
the control unit computes amplitude of the power grid voltage based on the voltage measured by the instrument transformer and determines from a computed amplitude of the power grid voltage whether the voltage on the power grid has decreased below the threshold.

5. Gas turbine power generation equipment for supplying electric power in cooperation with intermittent renewable energy generation equipment in a local grid interconnected to a power grid, the gas turbine power generation equipment comprising:
a fuel flow control device for controlling a flow rate of fuel supplied to a combustor;
an instrument transformer for detecting a voltage on the power grid;
an air flow control device for controlling a flow rate of compressed air that has been compressed by a compressor and is supplied to the combustor; and
a control unit configured to, when voltage on the power grid detected by the instrument transformer decreases below a threshold, output a control signal to at least one of the fuel flow control device and the air flow control device to decrease at least one of the fuel flow rate and the flow rate of the compressed air, and to increase a reduced flow rate of at least one of the fuel and the compressed air after an elapse of a predetermined time; wherein:
the fuel flow control device is a fuel flow control valve that controls the flow rate of fuel supplied to the combustor;
the air flow control device includes an inlet air flow control valve that controls a flow rate of air taken into the compressor, and a bleed air flow control valve disposed in a bleed system for causing a portion of the air discharged from the compressor to detour the combustor, the bleed air flow control valve controlling bleed air discharged from the compressor; and
when the voltage on the power grid decreases below the threshold, the control unit outputs the control signal for at least one of immediately closing and opening the fuel flow control valve, immediately closing and opening the inlet air flow control valve, and immediately opening and closing the bleed air flow control valve; and
wherein:
when the voltage on the power grid has been lower than the threshold for a predetermined time and, on top of that, when an opening degree of the fuel flow control valve is less than a threshold, the control unit outputs control signals to immediately close and open the fuel flow control valve, immediately open and close the bleed air flow control valve, and immediately close and open the inlet air flow control valve.

* * * * *